United States Patent
Adams et al.

(10) Patent No.: US 11,972,025 B2
(45) Date of Patent: *Apr. 30, 2024

(54) STORED IMAGE PRIVACY VIOLATION DETECTION METHOD AND SYSTEM

(71) Applicant: BlackBerry Limited, Waterloo (CA)

(72) Inventors: Neil Patrick Adams, Waterloo (CA); Robert Joseph Lombardi, Hamilton (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/187,206

(22) Filed: Mar. 21, 2023

(65) Prior Publication Data

US 2023/0229809 A1    Jul. 20, 2023

Related U.S. Application Data

(63) Continuation of application No. 16/669,927, filed on Oct. 31, 2019, now Pat. No. 11,625,495.

(51) Int. Cl.
*G06F 21/62* (2013.01)
*G06F 18/21* (2023.01)
*G06F 18/22* (2023.01)

(52) U.S. Cl.
CPC .......... *G06F 21/6254* (2013.01); *G06F 18/21* (2023.01); *G06F 18/22* (2023.01); *G06F 21/6209* (2013.01)

(58) Field of Classification Search
CPC ...... G06F 21/6209; G06F 18/22; G06F 18/21; G06K 9/6201; G06K 9/6217
See application file for complete search history.

(56) References Cited

U.S. PATENT DOCUMENTS

| | | | |
|---|---|---|---|
| 5,933,851 | A | 8/1999 | Kojima et al. |
| 7,333,655 | B1 | 2/2008 | Swift et al. |
| 8,887,289 | B1 | 11/2014 | Hullale |
| 9,703,974 | B1 | 7/2017 | Surkatty |
| 10,146,925 | B1 * | 12/2018 | Rosenberg .............. G06F 21/32 |
| 2002/0099578 | A1 | 7/2002 | Eicher et al. |
| 2004/0021678 | A1 * | 2/2004 | Ullah .................... G06F 9/5027 715/700 |
| 2006/0069733 | A1 | 3/2006 | Antonoff et al. |

(Continued)

FOREIGN PATENT DOCUMENTS

AU    2019202398 A1    4/2019

OTHER PUBLICATIONS

EPO: Extended European Search Report relating to EP application No. 20203048.2, dated Mar. 22, 2021.

(Continued)

*Primary Examiner* — Vance M Little
(74) *Attorney, Agent, or Firm* — Rowand LLP

(57) ABSTRACT

Methods and systems for detecting a privacy violation in an image file. A policy to be used by a master imaging application is obtained and a file system is monitored for a digital image modified by a monitored imaging application. It is then determined that the digital image file includes at least some content in violation of a defined setting for the master imaging application and, based on the determination that the digital image file includes at least some content in violation of the defined setting for the master imaging application, taking an action.

18 Claims, 8 Drawing Sheets

(56) References Cited

U.S. PATENT DOCUMENTS

| | | | |
|---|---|---|---|
| 2008/0180538 A1 | 7/2008 | Jung et al. | |
| 2011/0225200 A1* | 9/2011 | Danis | G06F 16/24564 726/1 |
| 2012/0180134 A1 | 7/2012 | Coughtrey et al. | |
| 2012/0250951 A1 | 10/2012 | Chen | |
| 2013/0124480 A1 | 5/2013 | Chua et al. | |
| 2013/0156331 A1 | 6/2013 | Kurabayashi et al. | |
| 2014/0089272 A1* | 3/2014 | Biswas | G06F 16/215 707/692 |
| 2015/0046970 A1 | 2/2015 | Shimizu | |
| 2015/0113664 A1 | 4/2015 | Aad et al. | |
| 2015/0227536 A1 | 8/2015 | Montulli et al. | |
| 2016/0078030 A1 | 3/2016 | Brackett et al. | |
| 2016/0212230 A1* | 7/2016 | Schneider | H04L 67/306 |
| 2016/0283743 A1 | 9/2016 | Rueger et al. | |
| 2018/0351956 A1 | 12/2018 | Verma | |
| 2021/0081567 A1* | 3/2021 | Park | G06F 21/6263 |

OTHER PUBLICATIONS

Orekondy et al.: "Connecting Pixels to Privacy and Utility: Automatic Redaction of Private Information in Images", 2018 IEEE/CVF Conference on Computer Vision and Pattern Recognition, IEEE, XP033473770, dated Jun. 18, 2018.

Van Der Velden: "Forensic devices for activism: Metadata tracking and public proof", Big Data & Society, vol. 2, No. 2, XP055785117, dated Nov. 2, 2015.

USPTO: Office Action relating to U.S. Appl. No. 16/669,927 dated Feb. 9, 2022.

USPTO: Final Office Action relating to U.S. Appl. No. 16/669,927 dated Aug. 1, 2022.

USPTO: Advisory Action relating to U.S. Appl. No. 16/669,927 dated Oct. 18, 2022.

EPO: Communication pursuant to Article 94(3) EPC relating to EP application No. 20203048.2 dated Feb. 28, 2023.

Canadian Office Action dated Oct. 19, 2023; Canada Patent Application No. 3,096,468.

* cited by examiner

STORED IMAGE PRIVACY VIOLATION DETECTION METHOD AND SYSTEM

CROSS-REFERENCE TO RELATED APPLICATIONS

The present application is a continuation of U.S. patent application Ser. No. 16/669,927 entitled "STORED IMAGE PRIVACY VIOLATION DETECTION METHOD AND SYSTEM" filed Oct. 31, 2019, the contents of which are hereby incorporated by reference.

FIELD

The present application generally relates to sensitive information in digital images, and more particularly, to identifying sensitive information in digital images and sanitizing digital images.

BACKGROUND

Digital images may contain sensitive information. In some cases, the sensitive information that is displayed in digital images is confidential corporate information.

In some other cases, the sensitive information is hidden from users. Electronic devices such as smartphones are often equipped with camera applications that add metadata to every photograph taken. For example, a global positioning system (GPS) enabled camera application may include, in a digital image, the exact location coordinates and time the image was captured. Users may not be aware that the digital image contains such sensitive information.

Users may share digital images with parties outside of an organization without realizing that they may also be sharing sensitive information. It would be advantageous to be able to ensure that digital images meet a certain level of privacy.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
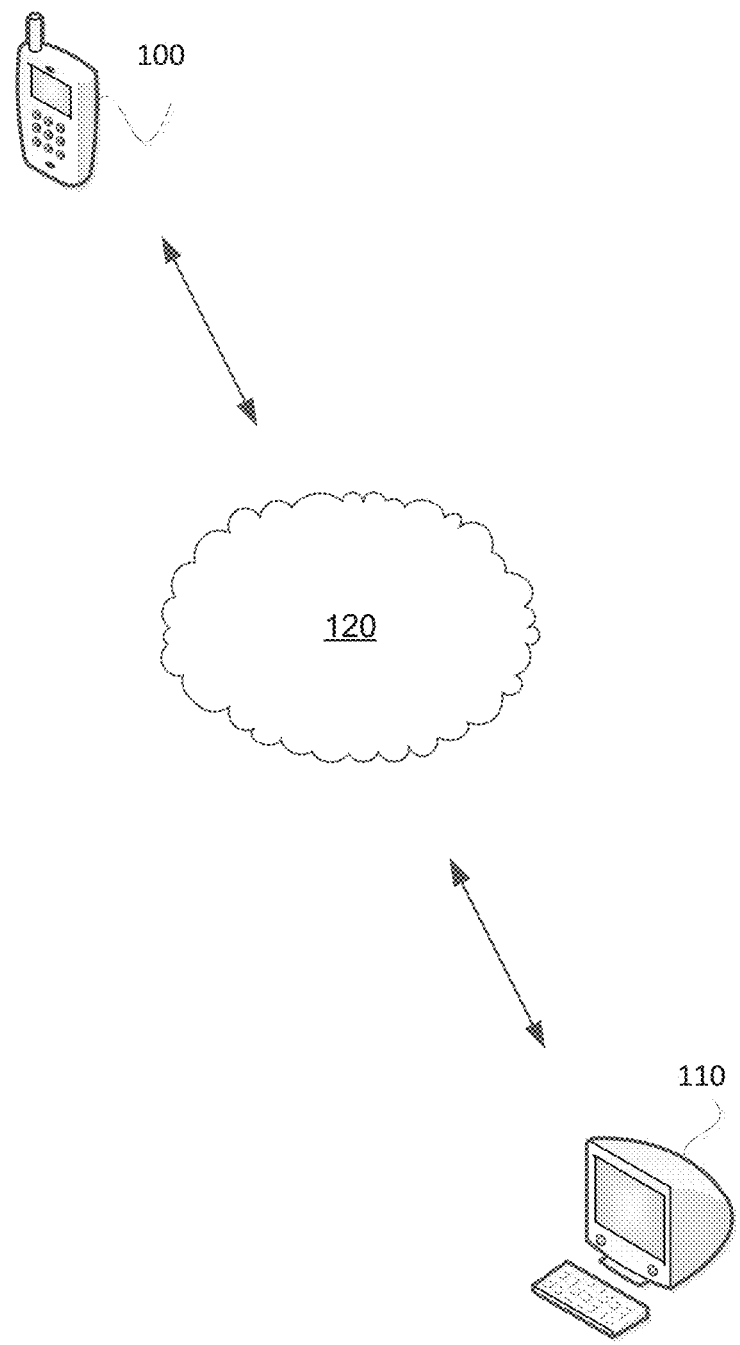
FIG. 1 is a schematic diagram illustrating an operating environment of an example embodiment.

In a first aspect, the present application describes a computer-implemented method of detecting a privacy violation in an image file. The method includes: obtaining a policy to be used by a master imaging application; monitoring a file system for a digital image file modified by a monitored imaging application; determining that the digital image file includes at least some content in violation of a defined setting for the master imaging application; and in response to determining that the digital image file includes at least some content in violation of the defined setting for the master imaging application, taking an action.

In some embodiments, monitoring the file system for the digital image file modified by the monitored imaging application includes continuously monitoring the file system and automatically detecting, in real-time, the modification of the digital image file by the monitored imaging application.

In some embodiments, monitoring the file system for the digital image file modified by the monitored imaging application includes automatically periodically scanning the file system for a digital image file modified by the monitored imaging application.

In some embodiments, monitoring the file system for the digital image file modified by the monitored imaging application includes, in response to input received at an input interface, scanning the file system for a digital image file modified by the monitored imaging application.

In some embodiments, taking the action involves processing the digital image file to modify the at least some content.

In some embodiments, taking the action involves generating a notification based on the violation.

In some embodiments, the notification identifies the monitored imaging application.

In some embodiments, the notification prompts for adjusting a setting associated with the monitored imaging application.

In some embodiments, the notification provides an option to modify the digital image file to comply with the policy.

In some embodiments, the method may further include receiving input at an input interface selecting the option to modify the digital image file to comply with the policy and in response to receiving input from an input interface selecting the option to modify the digital image file, modifying the digital image file.

In another aspect, the present application describes computing devices configured to implement such methods.

In another aspect, the present application describes a computing device. The computing device includes a memory and a processor coupled with the memory. The processor is configured to: obtain a policy to be used by a master imaging application; monitor a file system for a digital image file modified by a monitored imaging application; determine that the digital image file includes at least some content in violation of a defined setting for the master imaging application; and in response to determining that the digital image file includes at least some content in violation of the defined setting for the master imaging application, take an action.

In some embodiments, the processor configured to monitor the file system for the digital image file modified by the monitored imaging application includes the processor configured to continuously monitor the file system and automatically detect, in real-time, the modification of the digital image file by the monitored imaging application.

In some embodiments, the processor configured to monitor the file system for the digital image file modified by the monitored imaging application includes the processor configured to automatically periodically scan the file system for a digital image file modified by the monitored imaging application.

In some embodiments, the processor further configured to take the action includes the processor configured to process the digital image file to modify the at least some content In some embodiments, the processor further configured to take the action includes the processor configured to generate a notification based on the violation.

In some embodiments, the notification identifies the monitored imaging application.

In some embodiments, the notification prompts for adjusting a setting associated with the monitored imaging application.

In some embodiments, the notification provides an option to modify the digital image file to comply with the policy.

In some embodiments, the processor is further configured to: receive input at an input interface selecting the option to modify the digital image file to comply with the policy; and in response to receiving input from an input interface selecting the option to modify the digital image file, modify the digital image file.

In some embodiments, the processor configured to monitor a file system for a digital image file modified by a monitored imaging application includes the processor configured to, in response to input received at an input interface, scan the file system for a digital image file modified by the monitored imaging application.

In another aspect, the present application describes a non-transitory computer-readable storage medium storing processor-executable instructions to detect a privacy violation in an image file. The processor-executable instructions, when executed by a processor, may cause the processor to: obtain a policy to be used by a master imaging application; monitor a file system for a digital image file modified by a monitored imaging application; determine that the digital image file includes at least some content in violation of a defined setting for the master imaging application; and in response to determining that the digital image file includes at least some content in violation of the defined setting for the master imaging application, take an action.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Reference is first made to FIG. 1, which is a schematic diagram illustrating an operating environment of an example embodiment. The network 120 is a computer network. The network 120 allows computer systems in communication therewith to communicate. For example, as illustrated, the network 120 allows the mobile computer system 100 to communicate with the target computer system 110. The network 120 may be used by the mobile computer system 100 share an image with the target computer system 110. The target computer system 110 may be adapted to display the digital image on a display interface.

Each of the mobile computer system 100 and the target computer system 110 may be in geographically disparate locations. Put differently, the mobile computer system 100 may be remote to the target computer system 110.

Each of the mobile computer system 100 and the target computer system 110 are, or include, one or more computing devices. The mobile computer system 100 may, as illustrated, be a smartphone. The target computer system 110 may, as illustrated, be a laptop computer. Alternatively, the mobile computer system 100 and the target computer system 110 may be, or may include, a device of another type such as, for example, a personal computer, a laptop computer, a tablet computer, a notebook computer, a hand-held computer, a personal digital assistant, a wearable computing device (e.g., a smart watch, a wearable activity monitor, wearable smart jewelry, and glasses and other optical devices that include optical head-mounted displays), or any other type of computing device that may be configured to store data and software instructions, and execute software instructions to perform operations consistent with disclosed embodiments.

In some embodiments, each of the mobile computer system 100 and the target computer system 110 may include multiple computing devices such as, for example, email servers, web servers, database servers, social networking servers, file transfer protocol (FTP) servers, and the like. The multiple computing devices may be in communication using a computer network. For example, in some embodiments, the mobile computer system 100 is a laptop computer and the target computer system 110 is a photo and video-sharing social networking service. In some embodiments, it is the mobile computer system 100 that is or is a component of a photo and video-sharing social networking service and the target computer system 110 is a desktop computer that is a client of the social networking service.

Figure 2:
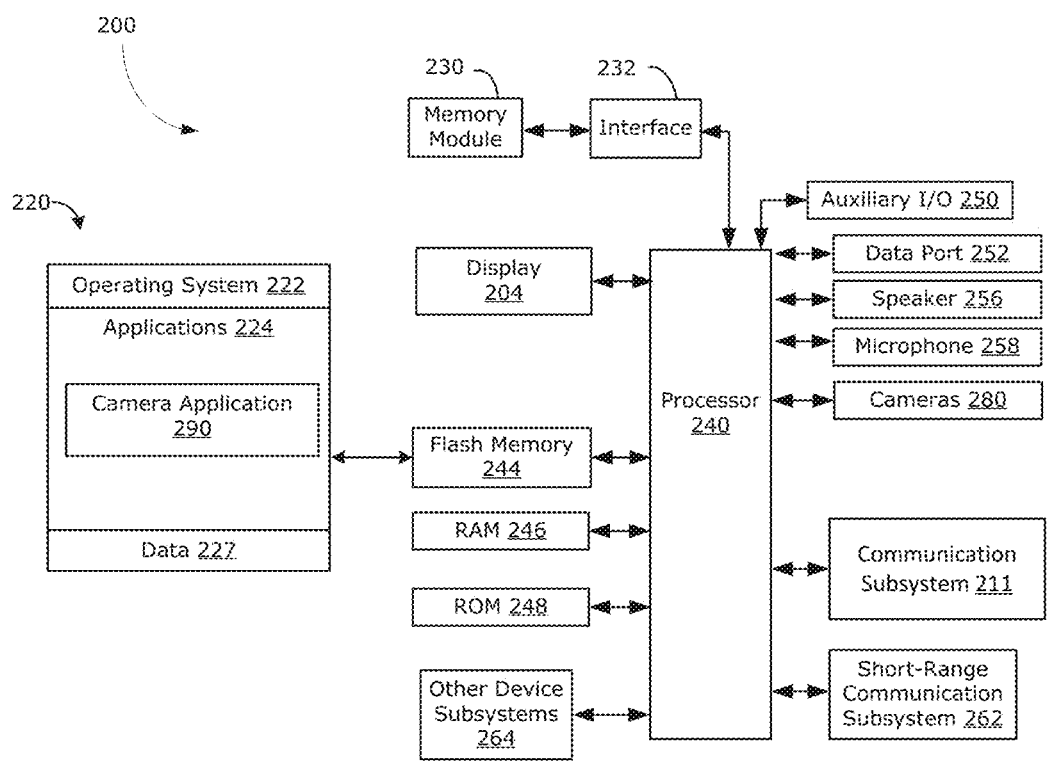
FIG. 2 is a block diagram illustrating components of an example embodiment of the mobile computing system of FIG. 1.

Reference is made to FIG. 2, which illustrates a block diagram of an example embodiment of the mobile computing system 100 of FIG. 1. In an example embodiment, the computing device 200 may be a mobile communication device. The mobile communication device may be configured for two-way communication, having data and optionally voice communication capabilities, and the capability to communicate with other computer systems, e.g. via the internet. In some embodiments, the computing device 200 may take other forms, such as smartwatches, computers, tablets, laptops, or any other electronic device configured for connection over wireless networks.

The computing device 200 of FIG. 2 may include a housing (not shown) which houses components of the computing device 200. Internal components of the computing device 200 may be constructed on a printed circuit board (PCB). The computing device 200 includes a controller including at least one processor 240 (such as a microprocessor) which controls the overall operation of the computing device 200. The processor 240 interacts with device subsystems, such as a wireless communication subsystem 211, for exchanging radio frequency signals with a wireless network to perform communication functions. The processor 240 interacts with additional device subsystems including one or more input interfaces (which may include, without limitation, any of the following: one or more cameras 280, a keyboard, one or more control buttons, one or more microphones 258, a gesture sensor, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces (such as a display 204), one or more speakers 256, or other output interfaces), a short-range communication subsystem 262, and other device subsystems generally designated as 264.

In some example embodiments, the auxiliary input/output (I/O) subsystems 250 may include an external communication link or interface, for example, an Ethernet connection. The communication subsystem 211 may include other wireless communication interfaces for communicating with other types of wireless networks, e.g. Wi-Fi networks.

In some example embodiments, the computing device 200 also includes a removable memory module 230 (typically including flash memory) and a memory module interface 232. Network access may be associated with a subscriber or user of the computing device 200 via the memory module 230, which may be a Subscriber Identity Module (SIM) card for use in a GSM network or other type of memory module for use in the relevant wireless network type. The memory module 230 may be inserted in or connected to the memory module interface 232 of the computing device 200.

The computing device 200 may store data 227 in an erasable persistent memory, which in one example embodiment is the flash memory 244. In some example embodiments, the data 227 may include service data having information required by the computing device 200 to establish and maintain communication with a wireless network. The data 227 may also include user application data such as messages (e.g. emails, texts, multimedia messages, etc.), address book and contact information, camera data, calendar and schedule information, notepad documents, image files, and other commonly stored user information stored on the computing device 200 by its users, and other data.

The data 227 stored in the persistent memory (e.g. flash memory 244) of the computing device 200 may be organized, at least partially, into a number of databases or data stores each containing data items of the same data type or associated with the same application. For example, image files, email messages, contact records, and task items may be stored in individual databases within the computing device 200 memory.

The short-range communication subsystem 262 provides for communication between the computing device 200 and different systems or devices, which need not necessarily be similar devices. For example, the short-range communication subsystem 262 may include an infrared device and associated circuits and components, a wireless bus protocol compliant communication mechanism such as a Bluetooth® communication module to provide for communication with similarly-enabled systems and devices, and/or a near-field communication (NFC) interface.

The computing device 200 includes one or more cameras 280. The cameras 280 are configured to generate camera data, such as images in the form of still photographs and/or video data. The camera data may be captured in the form of an electronic signal which is produced by an image sensor associated with the cameras 280. More particularly, the image sensor is configured to produce an electronic signal in dependence on received light. The image sensor converts an optical image into an electronic signal, which may be output from the image sensor by way of one or more electrical connectors associated with the image sensor. The electronic signal represents electronic image data, which may be referred to as camera data.

A set of applications that control basic device operations, including data and possibly voice communication applications, may be installed on the computing device 200 during or after manufacture. Additional applications and/or upgrades to an operating system 222 or software applications 224 may also be loaded onto the computing device 200 through the wireless network, the auxiliary I/O subsystem 250, the data port 252, the short-range communication subsystem 262, or other suitable device subsystems 264. The downloaded programs or code modules may be permanently installed; for example, written into the program memory (e.g. the flash memory 244), or written into and executed from the RAM 246 for execution by the processor 240 at runtime.

The processor 240 operates under stored program control and executes software modules 220 stored in memory such as persistent memory, e.g. in the flash memory 244. As illustrated in FIG. 2, the software modules 220 may include operating system software 222 and one or more applications 224 (or modules). Specific examples of applications that may be resident on the computing device 200 include file sharing applications and media applications for capturing and/or editing one or more forms of digital media including images, videos and/or sound. Specific examples of file sharing applications include an email messaging application, as well as other types of messaging applications for instant messaging (IM), short message service (SMS), and social networking or messaging applications. Media applications may include imaging applications. Specific examples of imaging applications include an image editor, a digital photography application for editing digital photographs, and a camera application 290 for using the cameras 280 to capture photographs and for editing photographs.

The operating system software 222 may provide a file system for storing, modifying and accessing files held in the persistent memory (e.g. flash memory 244) of the computing device 200. This file system may be accessible to other programs running on the processor 240 via a programmatic interface provided by the operating system software 222.

Figure 3:
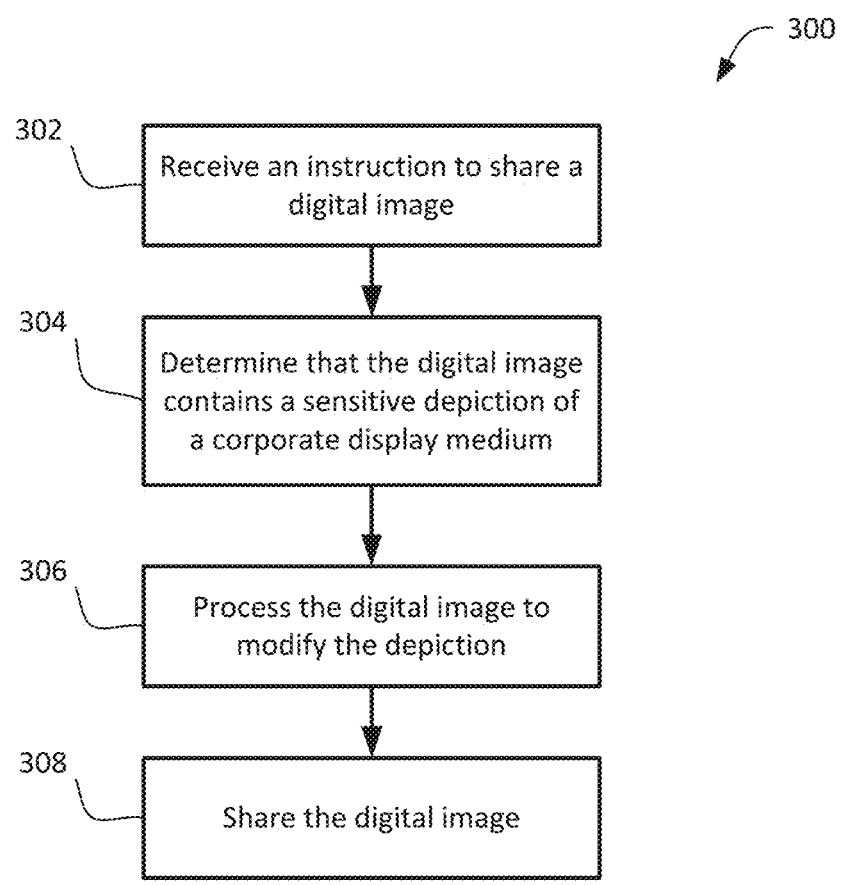
FIG. 3 shows a flowchart illustrating an example method of removing sensitive information from a digital image.

Reference is made to FIG. 3, which shows, in flowchart form, an example method of removing sensitive information from a digital image. The method 300 is performed by a computer system such as, for example, the computing device 200 of FIG. 2. The computer system has a processor that is coupled with a memory. The processor is configured to perform the method 300 and, more specifically, is configured to receive an instruction to share a digital image, and in response to receiving the instruction to share the digital image, determine that the digital image contains a depiction of a corporate display medium that is classified as sensitive based on a policy, and in response to determining that the digital image contains the depiction of the corporate display medium that is classified as sensitive based on the policy, process the digital image to modify the depiction, and share the digital image.

Figure 5:
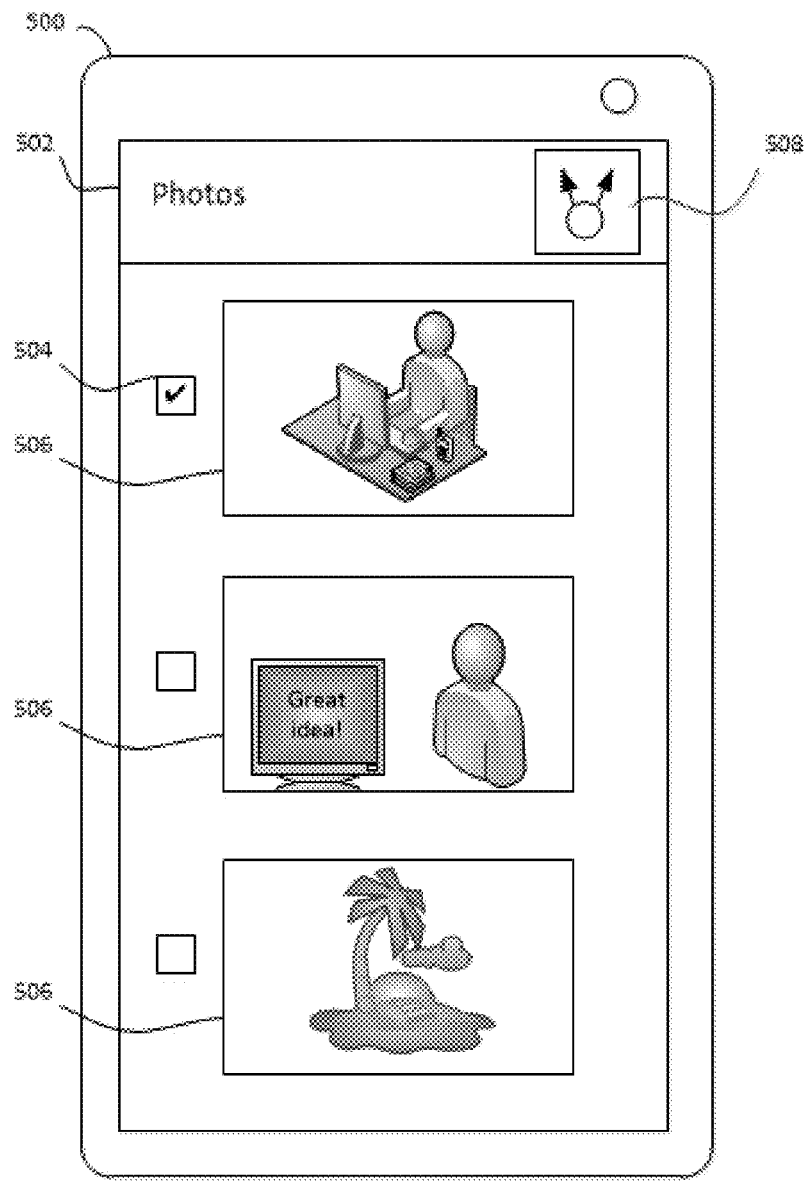
FIG. 5 is an illustration of the front view of an example electronic device displaying an option to share a digital image.

The method 300 starts with an operation 302. In operation 302, an instruction is received to share the digital image. The instruction may correspond to or be based on input received at an input interface. For example, the instruction may correspond to or be triggered by a user clicking or tapping the share button 508 displayed by the electronic device 500 of FIG. 5. FIG. 5 is an illustration of the front view of an example electronic device 500. The electronic device 500 may be a smartphone that implements the computing device 200 of FIG. 2. The display interface 502 shows the graphical user interface of a photo gallery application. The gallery includes three digital images 506, the first of which is shown as selected via the checkbox user interface element 504. Users are presented with, via the share button 508, the option to share the selected photo. The share button 508 may be tapped or clicked to indicate selection of the option to share the image.

In some embodiments, the instruction to share the digital image includes an indication of the digital image file that should be shared. In one example, the digital image is in a JPEG file format, although other image formats may be used.

Figure 6:
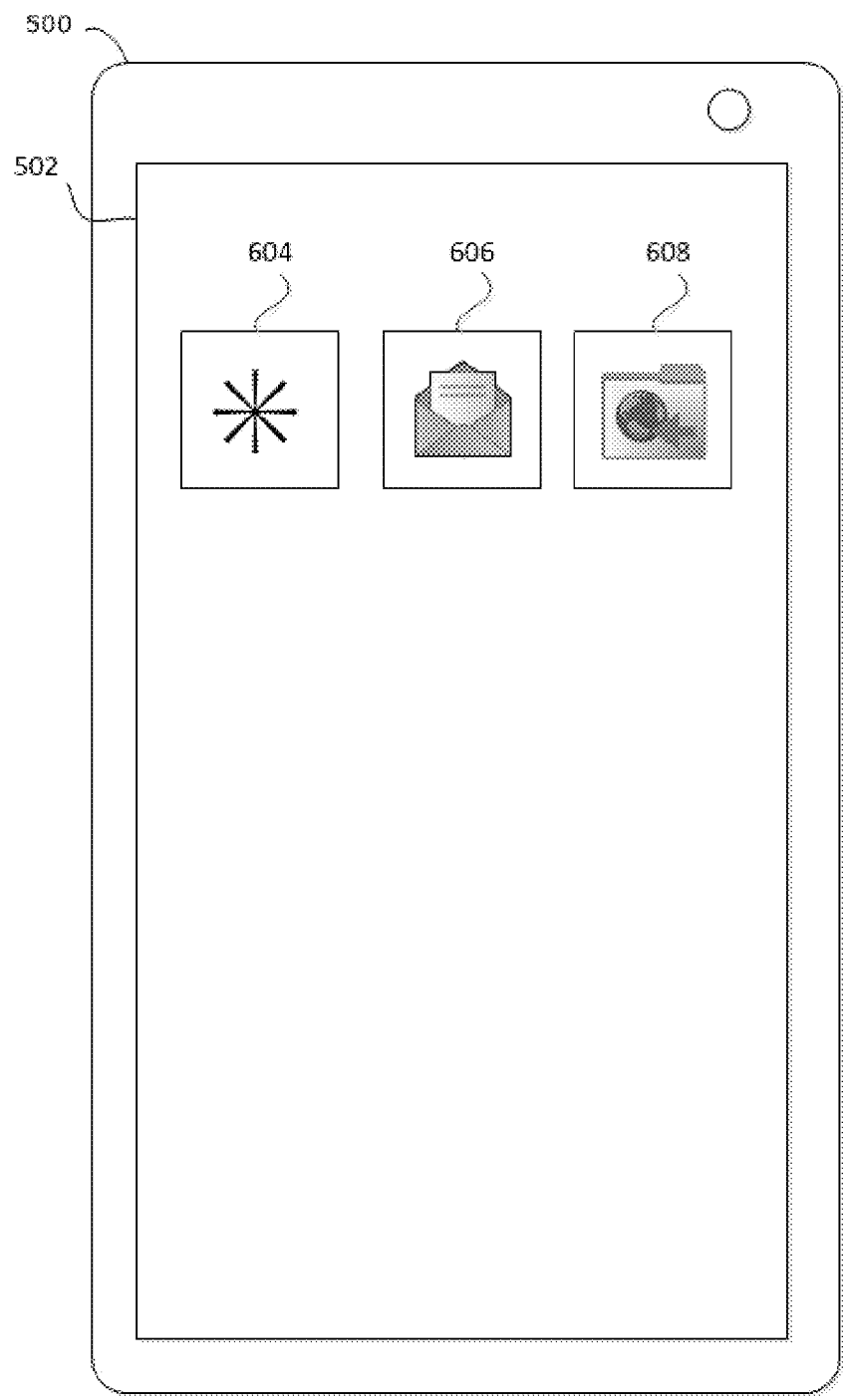
FIG. 6 is an illustration of the front view of an example electronic device displaying a list of applications.

In response to invoking the share button 508, the display interface 502 may present, as shown in FIG. 6, a list of applications that can be invoked. The email icon 606 and ftp icon 608 may correspond to an email application and an ftp application, respectively, that may be used to share the digital image. In some cases, operations 304 and 306 in the method 300 occur prior to displaying the list of applications to a user. The sanitization icon 604 may correspond to a sanitization application that may provide options and features related to sanitizing the digital image prior to sharing the digital image with others. The instruction to share the digital image may correspond to or be triggered by a user clicking or tapping the sanitization icon 604. In some embodiments, in response to invoking the share button 508, the sanitization application is launched automatically, without the list of application icons first being displayed.

Following the operation 302, the method 300 includes, in operation 304, in response to receiving the instruction to share the digital image, determining that the digital image contains a depiction of a corporate display medium that is classified as sensitive based on a policy. The digital image may comprise of one or more depictions of corporate display medium. In some embodiments, a corporate display medium is a corporate medium that is configured to perform the function of presenting corporate information in a visual form. By way of example, a corporate display medium may comprise: a document; particular boards such as, for example, a whiteboard, a bulletin board, a corkboard, and a blackboard; paper and stationery supplies such as, for example, one or more sheets of paper, a pad of paper having a plurality of paper sheets, a flipchart, ruled or lined paper, grid paper, a sticky note, a notebook, a notepad, a drawing pad, and a memo pad; particular filing supplies such as, for example, a file folder, a label, a file label, a binder, a binder label, a storage box and a storage box label; desktop supplies and accessories such as, for example, a paper tray and an inbox/outbox for paperwork; mailing supplies such as, for example, an envelope and an address label; a wall or desk calendar; a name tag; an identification or security badge; or particular electronic equipment or devices such as, for example, a computer monitor, a projector screen, a laptop computer, a tablet computer, an internet protocol (IP) phone and a smartphone.

The corporate display medium may include a display surface that is configured to perform the function of presenting corporate information in a visual form. Examples of display surfaces include a computer monitor screen, a smartphone screen and an internet protocol (IP) phone screen. In some cases, the display surface may provide additional functionality. In one example, the display surface comprises of a touchscreen input interface that is configured to receive input through a touch. In another example, the display surface comprises of a writing surface of a whiteboard or a sheet of paper that is configured to receive markings made by a human.

In some cases, the corporate display medium contains content. In other words, the corporate display medium presents information. For example, a sheet of paper may contain markings in the form of hand writing, a drawing, or electronically or mechanically printed information. As another example, a computer monitor may display an electronic document containing text. In some cases, the corporate display medium may be content-free and present no corporate information. Examples of content-free corporate display medium include, but are not limited to, a blank sheet of paper, a computer monitor that is turned off, and an empty sheet of lined paper.

A depiction of a corporate display medium may be classified as sensitive based on a policy. The policy may be a sanitization policy and include an enterprise defined policy and/or a user defined policy. In some embodiments, an enterprise policy server can be used to provide policy data that is customizable on a per-user basis. In some embodiments, the enterprise policy cannot be customized on a per-user basis or overridden by a user defined policy. The policy is generally a data structure or other information that includes a set of preferences or other criteria for defining the behaviour of operations for sanitizing and sharing a digital image and detecting a privacy violation in an image file. Accordingly, an enterprise may use the policy to prevent the sharing or communication of sensitive features of digital images.

Some of the criteria may be based on characteristics of a depicted corporate display medium. The criteria that is used to classify a depiction as sensitive may be based on, for example, the type of corporate display medium that is depicted, the presence or absence of content in the depiction, and whether the corporate display medium has a display surface that is displayed or visible in the digital image. The policy may contain a list of types of corporate display medium that are sensitive. In some implementations, if a particular type of corporate display medium is defined as sensitive in the policy and the image contains a depiction of a corporate display medium of that type, then the depiction is classified, deemed or determined to be sensitive. In some implementations, the policy may also require that the depicted corporate display medium contain content in order for the depiction to be classified or deemed as sensitive. In some implementations, the policy may further require that the content of the depicted corporate display medium contain sensitive information in order for the depiction to be classified or deemed as sensitive. Sensitive information may include, for example, a sensitive word, face, or corporate logo.

Various techniques and algorithms may be implemented to determine whether a digital image contains a depiction of a particular corporate display medium. These algorithms may rely on one or more object or pattern recognition or detection models. The algorithms that are implemented may vary depending on the type of object being searched for. For example, the method used to detect a face may be different than the method used to detect a computer monitor.

One approach to object recognition may involve image segmentation and blob analysis, which uses object properties such as colour, texture, shape and size. The digital image is segmented into segments or sets of pixels that share some common visual characteristic using techniques such as contrast enhancement. The segmented regions or objects may be subjected to feature extraction. Typical features detected by feature extraction algorithms include edges, corners, blobs and ridges. Other properties such as colour, texture, shape and size of the objects may also be analyzed. Various rough and detailed classification steps may be successively applied to the objects to compare their feature sets with a set of standard patterns, such as patterns for a smartphone, a sheet of paper, a whiteboard and other corporate display mediums that may be classified as sensitive based on the policy, stored in a database and to determine the object classes.

Another approach to object recognition may involve template matching, in which a small image, referred to as a template image, is used to locate matching regions in a larger source image. The template image is compared to a region of source image as the template image is slid over the source image. The comparison involves determining the correlation between the template image and a region of the source image. A matching region is identified based on the degree of correlation between the template image and the source image. The template image may be an image of a corporate display medium that is stored in a database and the source image may be the digital image that is being shared.

Various techniques and algorithms may be implemented to determine whether a depiction of a particular corporate display medium is content-free. These algorithms may rely on one or more object or pattern recognition or detection models noted above. In some cases, a depiction may be considered content-free if no objects, text or features, such as edges, corners, blobs or ridges, are detected in the depiction other than those found in a standard pattern or a template image. For example, a sheet of lined paper may be considered content-free when a pattern of straight, parallel, evenly spaced lines is detected in the area of the image occupied by the sheet of lined paper, but no other features, such as blobs, circles, non-parallel lines or other markings, are detected in that area. In some cases, a depiction of a corporate display medium is considered content-free if the region of the digital image that is occupied by display surface of the corporate display medium is content-free or a particular portion of the corporate display medium is content-free. Some algorithms may be based on examining the set of pixels of the digital image that comprise the display surface and determining that the pixels have relatively the same colour. In some embodiments, a display surface may be considered content-free if the region bounded by the display surface is filled in with a uniform colour or a colour gradient.

In some embodiments, the digital image is displayed in a graphical user interface using a display interface. Some or all of the objects that are detected in the digital image may be highlighted. For example, the outline or boundaries of the corporate display medium, or parts of the corporate display medium, for example a display surface, or objects identified as sensitive, may be highlighted.

Following the operation 304, the method 300 includes, at the operation 306, in response to determining that the digital image contains the depiction of a corporate display medium that is classified as sensitive based on a policy, processing the digital image to modify the depiction.

In some embodiments, processing the digital image to modify the depiction may involve modifying the entire depiction of the corporate display medium. In some embodiments, processing the digital image to modify the depiction may involve modifying only a portion of the depiction, for example, a display surface of the corporate display medium.

The depiction may be modified in any of a number of ways. Modifying the depiction may include blurring the depiction, or a portion thereof, in order to reduce detail in the depiction. In some cases, blurring may render either the corporate display medium unrecognizable, the type of corporate display medium unrecognizable, or any content in the corporate display medium unintelligible.

Figure 7:
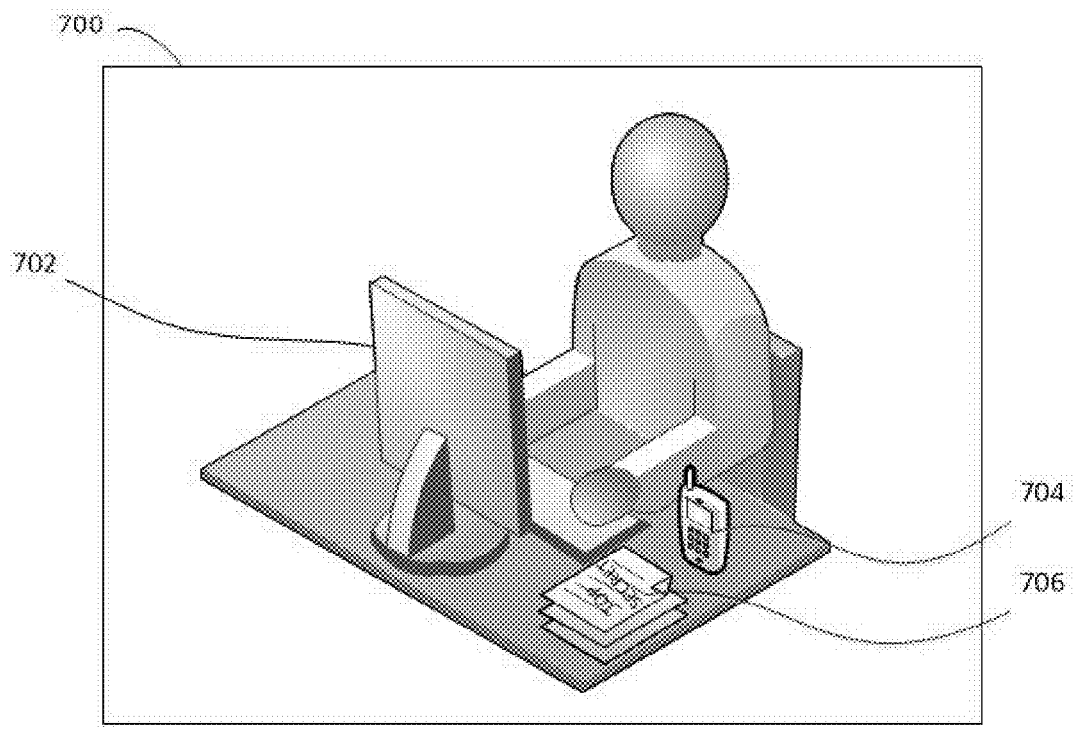
FIG. 7 is an illustration of an example digital image containing sensitive information, including a depiction of a stack of paper and a smartphone.
Figure 8:
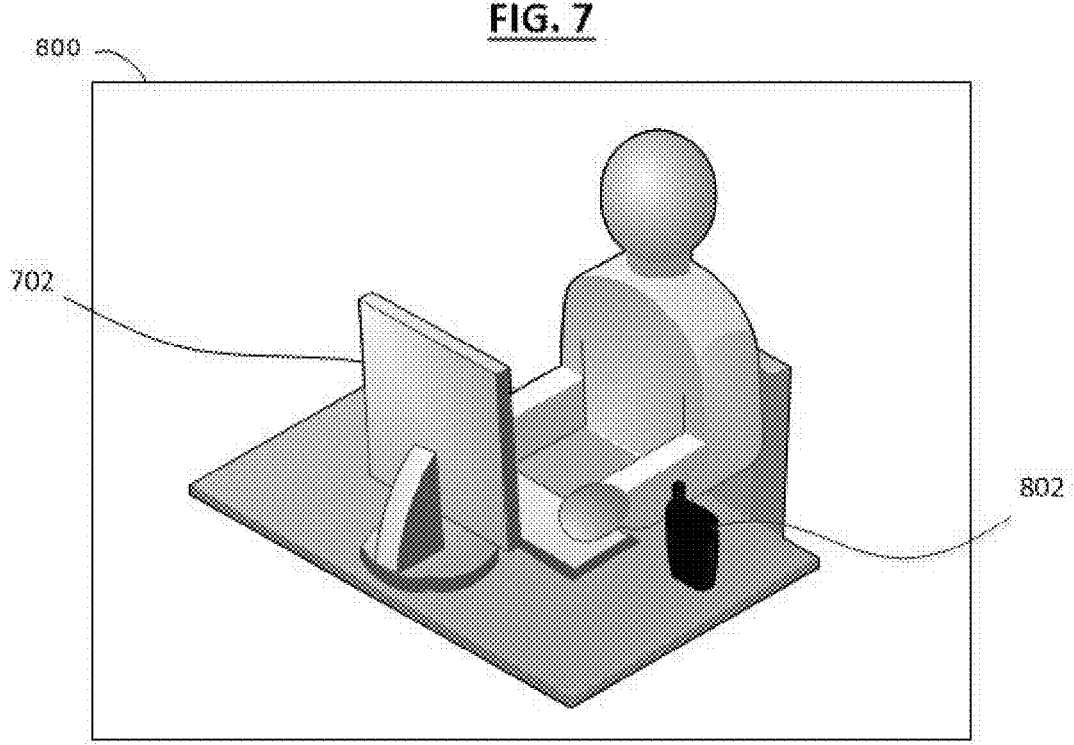
FIG. 8 is an illustration of the digital image of FIG. 7 after being sanitized.

In some embodiments, processing the digital image to modify the depiction comprises erasing the depicted corporate display medium or a portion thereof. Modifying the depiction may also involve erasing the depiction from the digital image. Erasing the depiction may involve replacing the area of the image occupied by the depiction of the corporate display medium with surrounding details of the depiction. The result is that the depiction of the corporate display medium essentially disappears from the image. As an example, in the case of an image depicting a sheet of paper located on an otherwise empty desk, erasing the depiction of the sheet of paper may involve replacing the area of the image occupied by the sheet of paper with details of the top of the desk. The modified image would show an empty desk with no sheet of paper on the desk. This example is illustrated by FIGS. 7 and 8. FIG. 7 is an illustration of an example digital image 700 containing sensitive information in the form of a stack of paper 706 and a smartphone 704. FIG. 8 is an illustration of the digital image 700 after processing. The modified digital image 800 is sanitized to remove the sensitive information. The stack of paper 706 has been erased and replaced with details of the top of the desk. In this case, the shade of grey of the desk is used to fill in the area that was occupied by the stack of paper 706. Note that in this example, the depiction of the computer monitor 702 in FIG. 7 is not modified. The computer monitor is oriented such that it is back of the computer monitor 702 that is shown and the display screen is not visible. No processing of the digital image 700 to modify the computer monitor 702 is necessary. FIG. 8 shows the computer monitor 702 as unaltered.

Figure 9:
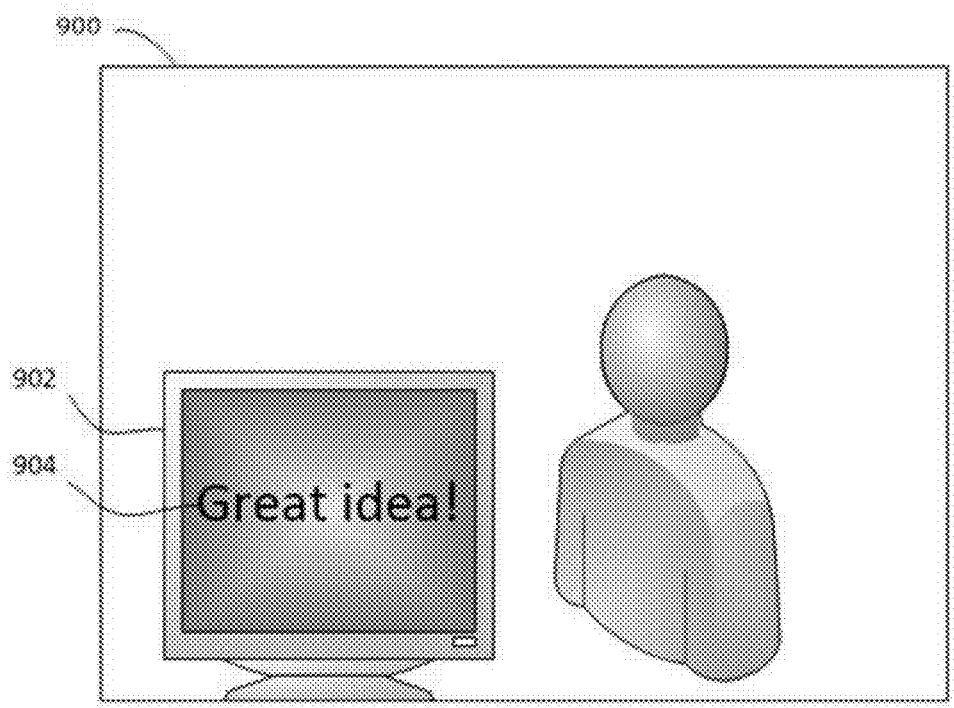
FIG. 9 is an illustration of an example digital image containing sensitive information, including a depiction of a computer monitor displaying text.
Figure 10:
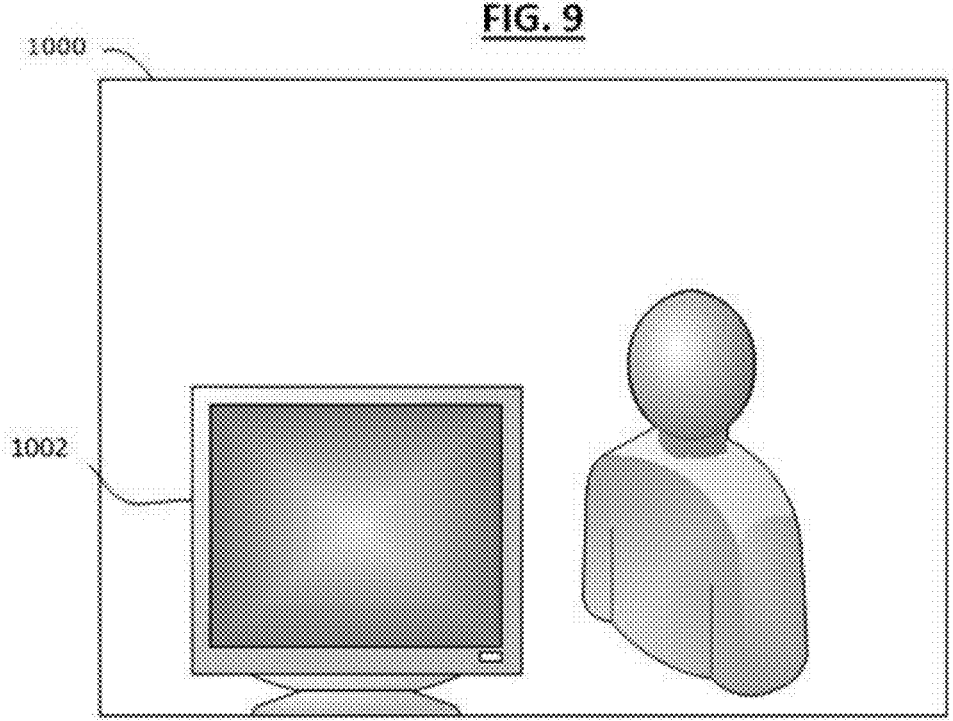
FIG. 10 is an illustration of the digital image of FIG. 9 after being sanitized.

In some embodiments, processing the digital image to modify the depiction comprises erasing the contents of the depicted corporate display medium. Erasing the contents of the depiction may involve replacing the area of the image occupied by the contents with surrounding details of the contents. In one example, an image may depict a sheet of lined paper containing handwriting. Erasing the contents of the lined sheet of paper, namely the handwriting, may involve determining that the lined sheet of paper contains markings, namely the handwriting, and removing the markings from the image by filling in the area occupied by the markings with details of the lined sheet of paper surrounding the markings. The modified image would show a depiction of an empty sheet of lined paper. In another example, the image may depict a whiteboard containing a drawing. Erasing the contents of the whiteboard may involve determining that the display surface of the whiteboard contains markings, namely the drawing, and changing the colour of the markings to match the colour of the whiteboard surface that surrounds the markings. Another example is illustrated by FIGS. 9 and 10. FIG. 97 is an illustration of an example digital image 700 containing sensitive information in the form of a computer monitor 902 displaying the text 904 "Great idea!". FIG. 10 is an illustration of the digital image 900 after processing. The modified digital image 1000 is sanitized to remove the sensitive information. The text 904 is erased and replaced with the shades of grey that surround the text 904 in FIG. 9.

In some embodiments, processing the digital image to modify the depiction comprises replacing or overlaying the depiction or a portion thereof with a replacement object. Examples of a replacement object include an icon, an emoji, a caricature, a shape, an advertisement, a logo, a depiction of a corporate display medium, a depiction of portion of a corporate display medium, and a depiction of a display surface of a corporate display medium. The replacement objects may be obtained from a library of objects.

In the case where the replacement object is a shape, any suitable shape or pattern may be used. In some embodiments, the replacement shape has the same boundaries or outline as the object being replaced, for example, the boundaries or outline of the sensitive depiction or the sensitive display surface. An example is illustrated by FIGS. 7 and 8. As noted above, FIG. 7 is an illustration of an example digital image 700 containing sensitive information in the form of a stack of paper 706 and a smartphone 704. FIG. 8 is an illustration of the digital image 700 after processing. The modified digital image 800 is sanitized to remove the sensitive information. The smartphone 704 has been replaced with a blob or shape 802 of the same shape and size as the smartphone 704 that is solid black in colour. In other words, the depiction of the smartphone 704 has been filled in with solid black.

The replacement object may be of the same type of object as that which is being replaced. For example, the replacement corporate display medium may be of the same type of corporate display medium as that being replaced. As a more specific example, a depiction of a notepad may be replaced by another depiction of a notepad. The replacement object may also be of a different type of object as that which is being replaced. For example, the replacement corporate display medium may be of a different type of corporate display medium as that being replaced. As a more specific example, a depiction of a notepad may be replaced by a depiction of a single sheet of paper.

In some cases, the replacement object may extend beyond the boundaries of the depiction of the corporate display medium, and in some cases the replacement object may occupy the same area as, or less than the area occupied by, either the depiction of the corporate display medium or a display surface thereof. For example, the replacement object may be a rectangle that covers the corporate display medium and extends into other areas of the image. In another example, a replacement depiction of a computer monitor screen may cover substantially the same area of the image as the original depiction of a computer monitor screen.

In some embodiments, processing the digital image to modify the depiction comprises replacing the depiction with a depiction of the same type of corporate display medium from a library comprising a second digital image containing a depiction of a second corporate display medium. As examples, a depiction of a sheet of lined paper may be replaced with a different depiction of a sheet of lined paper obtained from a library of digital images, or a depiction of a whiteboard may be replaced with that of another whiteboard obtained from the library.

In some embodiments, processing the digital image to modify the depiction comprises injecting fake information into the digital image. For example, the contents of the corporate display medium may be replaced with fake information. As more specific examples, the text on a document may be replaced with fake text and the contents of a whiteboard may be replaced with a fake drawing. In some implementations, injecting fake information into the digital image involves adding fake data without replacing another object in the digital image.

In the case of a content-free depiction of a corporate display medium, no processing of the digital image to modify the depiction may be necessary. In some embodiments, the digital image is processed only if the image contains a corporate display medium that is both classified as sensitive and contains content. For example, in the case where the image contains one or more corporate display medium that are classified as sensitive and contain content, and one or more corporate display medium that are classified as sensitive but are content-free, the image may be processed to modify the corporate display medium that are sensitive and contain content and not modify the corporation display medium that are sensitive but are content-free.

In some embodiments, processing the digital image to modify the depiction is based on input received at an input interface. For example, the extent to which the depiction is blurred may be determined based on input received at an input interface.

In some implementations, the method 300 may further comprise, in response to processing the digital image to modify the depiction, generating a thumbnail image based on the digital image and including the thumbnail image in the metadata for the digital image.

In some cases, the digital image comprises a frame of a video and the method 300 further comprises processing the video to modify the depiction in a plurality of frames of the video.

The method 300 also includes, at the operation 308, sharing the digital image. Sharing the digital image may involve transferring, or providing a copy of, the modified digital image to a third party computing device. The original digital image may be kept intact and unmodified or may be deleted from the file system. For example, the method 300 may be performed by a corporate website server and the digital image may be shared by transferring the digital image to client computing systems that download the digital image.

Many of the embodiments described in the present application focus on a corporate display medium. However, it is understood that the present application is not limited to such embodiments and that the embodiments described generally can easily be extended to digital images that contain other sensitive content. Examples of other sensitive content may include human faces and alcoholic beverage containers, for example, a wine bottle or glass, and a beer bottle, can, or mug.

In some embodiments, the method 300 may further comprise, in response to receiving the instruction to share the digital image, identifying a particular face in the digital image and modifying the particular face. Modifying the particular face may be performed according to the techniques and operations described in the present application in relation to a corporate display medium and may also include replacing the face with a caricature. In some implementations, a particular face is modified unless the particular face is determined to correspond to a face shown on an identification badge, for example an employee identification badge, and the person associated with the identification badge has provided their permission to include their face in digital images.

In some embodiments, the method 300 may further comprise, prior to processing, displaying the digital image, automatically preselecting the depiction, providing an indication at the display interface of the preselected depiction, and receiving input at an input interface relating to a selection of an object depicted in the digital image. In some embodiments, input may be received at an input interface that deselects the automatically preselected depiction. Input may also be received that indicates the selection of a depiction of a corporate display medium or other object that was not automatically preselected. For example, a face in the digital image may be selected. The method may further involve processing the digital image to modify the selected depictions and objects. In the case where an automatically preselected depiction is deselected, no processing of the digital image to modify the depiction may be necessary.

The selection and deselection inputs received at the input interface may be used to update the policy in the method 300 and, for example, to change the criteria for the types of objects are automatically preselected. More specifically, if a particular type of object or particular face has been selected, the policy may be updated so that the particular type of object or particular face will be automatically preselected in subsequent performances of the method 300. Accordingly, the policy may be based on input relating to a selection of an object depicted in a second digital image.

In some embodiments, the method 300 may further comprise displaying metadata associated with the digital image on a display interface. The computer system implementing the method 300 may include a processor coupled with a display interface, where the processor is configured to display metadata associated with the digital image on the display interface. Examples of metadata that may be associated with a digital image include: description information, including a title, a subject, a rating, a caption, tags and comments; origin information, including the authors, date taken, time taken, program name, date acquired, copyright artist, and copyright details; image information, including an image identifier, image dimensions, image width, image height and a thumbnail image; camera information, including a camera maker, camera model, camera serial number, f-stop, exposure time, focal length, subject distance and flash mode; and file information, including a filename, file type, folder path, date created, date modified and size. The contents of a digital image file may include both metadata and image data. However, the metadata that is associated with a digital image is not limited to the metadata located within a digital image file. For example, while a title, image thumbnail or copyright statement may be stored within a digital image file, a filename may be stored outside of the digital image file and in a file system directory. Accordingly, the metadata that is associated with a digital image may be obtained from within the contents of the digital image, a location outside of the contents of the digital image, or a combination thereof.

In some embodiments, some and not all of the metadata that is associated with the digital image is displayed on a display interface. The determination of the metadata that should be displayed may be made on the basis of the policy. The policy may indicate that particular fields, for example a location field, are sensitive. In some embodiments, all of the sensitive metadata fields are displayed. Displaying a metadata field may involve displaying the field name, the field value, or both. In embodiments where the digital image is displayed on the display interface, displaying the metadata may involve overlaying the digital image with the metadata.

In some embodiments, the method 300 may further comprise automatically preselecting a field of metadata associated with the digital image based on the policy. In some embodiments, input may be received at an input interface that deselects the automatically preselected field of metadata. Input may also be received that indicates the selection of a metadata field that was not automatically preselected.

In some embodiments, the method 300 may further comprise processing the metadata to modify the preselected field. In some cases, the modification may involve removing the field by, for example, deleting the value set for the field. In some cases, the modification may involve replacing the field value with other information. The other information may be correct or fake information. As an example, an empty copyright field may be replaced with a correct copyright statement. As another example, global positioning system (GPS) coordinates in the location field may be replaced with fake GPS coordinates. In some cases, the modification may involve adding a new field containing information, which may include fake information. Fake information may include information that is randomly generated, for example, randomly generated GPS coordinates.

Figure 4:
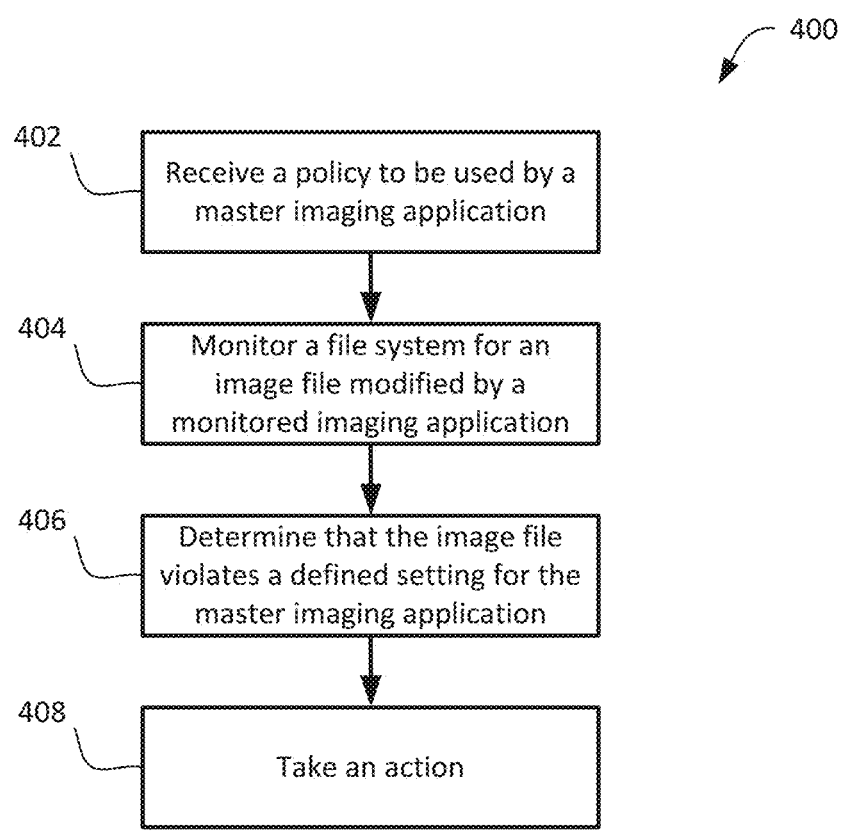
FIG. 4 shows a flowchart illustrating an example method of detecting a privacy violation by a digital image file.

Reference is made to FIG. 4, which shows, in flowchart form, an example method of detecting a privacy violation by a digital image file. In the method 400, reference is made to a "master" application and a "monitored" application. In the master/monitor model, a master application may represent an application that has particular settings that should be satisfied, met, or adhered to by a monitored application. A monitored application may represent an application whose file modification actions are monitored for violations of particular settings of the master application.

The method 400 is performed by a computing device such as, for example, the computing device 200 of FIG. 2. The computing device has a processor that is configured to obtain a policy to be used by a master imaging application, monitor a file system for a digital image file modified by a monitored imaging application, determine that the digital image file includes at least some content in violation of a defined setting for the master imaging application, and in response to determining that the digital image file includes at least some content in violation of the defined setting for the master imaging application, take an action based on the determination of the violation.

The master imaging application and the monitored imaging application may be imaging applications of the same type or of different types. For example, the master imaging application and the monitored imaging application may both be camera applications for capturing photographs. As another example, the master imaging application may be a camera application for capturing photographs and the monitored imaging application may be an editing application for altering photographs captured by a camera application. As another example, the master imaging application may be the sanitization application in the example method described in FIG. 3 and the monitored imaging application may be a camera application.

The method 400 starts with an operation 402. In operation 402, a policy is obtained for use by a master imaging application. In some embodiments, the policy is substantially the same as the example policy described in FIG. 3. The policy may be used by the master imaging application to set or adjust a user preference, or be a defined, default or other setting. For example, the policy may adjust a location setting of the master imaging application.

It is understood that the settings of the master imaging application may be separate and distinct from those of the monitored imaging application, but that the settings of each application may provide the same or similar functionality.

A setting may correspond to one or more image metadata fields. For example, a setting may contain text that may be used to populate a metadata field. In some embodiments, when a photograph is taken and an image file is created, the text of copyright artist and details settings may be copied into respective copyright artist and details metadata fields of the image file. It is understood that other metadata fields may be populated with text from other settings.

In some embodiments, a setting may enable the inclusion of a metadata field in the digital image. Specifically, a setting may indicate that a particular metadata field may be populated automatically by an imaging application when the image is modified by the imaging application. In some cases, the setting may be set to one of two states, such as "enabled" and "disabled". It will be appreciated that other values may be used, for example, "on/off" or "yes/no". As an example, a location setting may correspond to a location metadata field. The location setting may control the addition of GPS location data to the metadata contained in digital image or video file captured by the master imaging application. In this example, if the setting is set to "enabled", then GPS location information may be added to the image metadata. If the setting is set to "disabled", then no GPS location information is stored in the metadata. As another example, a date setting set to "yes" may indicate that the "date taken" metadata field should be populated with the date on which a digital photograph was captured, and a date setting set to "no" may indicate that the "data taken" metadata field should not be populated. As yet another example, a thumbnail setting may indicate whether a thumbnail of the image should be generated and inserted into the image metadata. As yet another example, there may be respective settings for enabling the addition of description information metadata such as a title, subject, rating, caption, tags, and comments.

A setting for an imaging application may also correspond to the application of one or more image processing functions. In some embodiments, a setting may indicate that particular image processing functions should be applied to an image. For example, a stamp setting may be set to "enabled" or "stamp photos" to cause the imaging application to modify images to display certain information. The stamp may, for example, overlay the image with the time and date on which the photograph was captured, the GPS altitude or location coordinates at which the photograph was captured, another image such as a copyright logo, and/or text such as a copyright statement. In some embodiments, the stamp may be formatted, for example, in the color yellow, to visually stand out from the image. In some embodiments, the stamp may be hidden in the image, blended in with colors or objects surrounding the stamp in the image, and/or be substantially transparent. In some cases, the stamp is a watermark. An application may include one or more stamp settings.

The method 400 further includes, in operation 404, monitoring a file system for a digital image file modified by a monitored imaging application. It is understood that, in some cases, monitoring the entire file system of the computer system may be inefficient or unnecessary. In some embodiments, only certain directories, such as an image gallery directory, may be monitored. In some embodiments, the file system of the computer system is monitored for a digital image file that is modified by any application or by other types of applications aside from a camera application, such as a photo editing application. In some embodiments, only digital images modified by particular application(s) may be monitored.

In some embodiments, monitoring a file system for a digital image file modified by a monitored imaging application includes continuously monitoring the file system and automatically detecting, in real-time, the modification of the digital image file by the monitored imaging application. The monitoring may be performed by a background process that continuously runs and monitors file system modification events, such as, for example, file creation events (indicating that a new file was created under the monitored directory), file update events (indicating that data was written to a file), file metadata update events (indicating that timestamps or other file metadata were changed) and file move events (indicating that a file or subdirectory was moved to the monitored directory). In some embodiments, a digital image file may be considered to be modified if one or more file system modification events occurs in relation to that file. Once a modification event is detected, the corresponding modified file may be analyzed to determine whether the file is an image file. Various techniques may be used to determine the type of a file. In some cases, the determination may be based on a filename extension and involve comparing the filename extension of the modified file to entries in a defined list of image filename extensions. If the list contains the filename extension, then the modified file may be considered to be an image file. In some embodiments, the processes running on the computer system can be monitored to identify the process and imaging application that modified the image file. In other embodiments, there may be another triggering event that causes the file system to be monitored.

In some embodiments, monitoring a file system for a digital image file modified by a monitored imaging application includes scanning the file system for a digital image file modified by an imaging application. The scanning operation may be performed automatically and periodically on a scheduled basis. In some cases, the scanning operation may be performed in response to input received at an input interface. In some embodiments, the metadata that is associated with the image file, for example the program name metadata fields, may be inspected to determine the application that modified the digital image file. In some embodiments, the system may determine if a file has been modified since the file system was last monitored. This determination may involve, for example, comparing a timestamp from a "date modified" metadata field to a timestamp of the last scan.

The method 400 further includes, in operation 406, determining that the digital image file includes at least some content in violation of a defined setting for the master imaging application. The determination may involve comparing the value of a defined setting to one or more metadata fields of the digital image file.

In some embodiments, a violation may occur if, for example, a defined setting is set to disabled and a corresponding image metadata field is present and/or set. As an example, the location, date taken and thumbnail settings for the master imaging application may all be set to disabled. If the contents of the digital image file includes GPS location information, a date taken, or a thumbnail, this may be deemed a violation of respective defined settings for the master imaging application. As another example, a disabled description setting may be violated if the image metadata includes any of a title, subject, rating, caption, tags and comments field. As yet another example, a disabled origin information setting may be violated if the image metadata includes any of an author, date taken, time taken, program name, date acquired, copyright artist, and copyright details field.

In some embodiments, a violation may occur if, for example, a defined setting corresponding to the application of one or more image processing functions is disabled, yet the image processing function has been applied to the digital image file. As an example, if a stamp setting for the master imaging application is set to disabled and the modified digital image includes a stamp, this may be considered a violation of the setting.

In some embodiments, a violation may occur if, for example, a particular defined setting is enabled and includes text, yet the digital image file includes a corresponding metadata field that does not match the text of the defined setting. As an example, a violation may occur if the digital image file includes copyright metadata text that does not match the copyright text of a defined setting.

In some embodiments, a violation may occur if, for example, a thumbnail setting is enabled and the thumbnail metadata does not match or correspond to the digital image. In some cases, this determination may involve scaling down the dimensions of the digital image to the dimensions of the thumbnail and comparing the pixels of the thumbnail to those of the scaled down digital image. In some cases, this determination may involve detecting the objects depicted in the thumbnail and the digital image and comparing the detected objects of the thumbnail to those of the digital image.

In some embodiments, the master imaging application and the monitored imaging application are the same imaging application and the method 400 verifies that the imaging application does not violate the imaging application's own settings. In some embodiments, the master imaging application and the monitored imaging application are distinct applications.

Any number of suitable techniques for determining a violation are contemplated by the present application. In some embodiments, the method 400 may involve determining that the digital image file includes at least some content depicting a corporate display medium in violation of a policy as generally described in the example method 300 described in FIG. 3.

The method further includes, in operation 408, taking an action. The action may be in response to determining that the digital image file includes at least some content in violation of a policy or a defined setting for the master imaging application. Other operations may also trigger the action taken. The action may be based on the violation and involve, for example, generating a notification and/or automatically modifying the digital image file.

In some cases, the notification may trigger a visual or audio alert that serves to provide feedback to a user. The feedback may identify the offending monitored imaging application and allow the user to take corrective action to prevent the offending application from causing further violations. The notification may identify the monitored imaging application by, for example, providing the program name of the monitored imaging application. The notification may also identify the defined setting that has been violated.

In some cases, the notification may cause a message to be transmitted to a third party system. The notification may be conveyed to a user, a corporate privacy policy department or more than one entity.

Other actions may also be triggered by the notification. The notification may prompt for adjusting a setting associated with the monitored imaging application. Specifically, the notification may prompt for, for example, toggling a setting between defined values, adding text, amending existing text, adding a date, updating a date, removing text or removing a date. In some embodiments, the notification may prompt for adjusting a setting associated with the monitored imaging application to match, mirror or comply with a policy or a corresponding defined setting associated with the master imaging application. The notification may also prompt for synchronizing one or more settings of the monitored imaging application with a policy or one or more settings of the master imaging application.

In the case of a violation based on a setting of the master imaging application that contains customizable text, the notification may prompt for editing a monitored imaging application setting. The notification may include text that should be used for editing the setting. For example, if the master imaging application contains a copyright author setting that is violated by a digital image file modified by the monitored imaging application, the notification may provide the name of the copyright author that is listed in the master imaging application and prompt for editing the copyright author setting in the monitored imaging application to match the provided name. In some embodiments, the notification may prompt for removing all text from a setting of the monitored imaging application. For example, the notification may prompt for removing all copyright information in settings in the monitored imaging application. As another example, the notification may prompt for editing or removing the content of one or more of a description, title, subject, rating, caption, tags, and comments setting of the monitored imaging application.

In the case of a violation based on a defined setting that set to "disabled" in the master imaging application, the notification may prompt for disabling a corresponding setting in the monitored imaging application. For example, if the GPS location setting for the master imaging application is used in determining that a violation had occurred, the notification may prompt for disabling a GPS location setting for the monitored imaging application. As another example, a violation based on one or more of a description, title, subject, rating, caption, tags, comments, author, date taken, time taken, program name, date acquired, copyright artist, copyright details, thumbnail and stamp setting of the master imaging application may cause a notification prompting for disabling respective settings for the monitored imaging application.

The notification may also provide an option to modify the digital image file to comply with the policy or defined settings of the master image application. Input may be received at in input interface that indicates the selection of the option to modify the digital image file to comply with the policy. The digital image file may be modified in response to receiving such input.

Other operations may also trigger the modification of the digital image file. For example, the digital image file may be modified in response to determining that the content of the digital image file or metadata associated with the digital image file violates a policy.

The method 400 may involve modifying at least the content of the digital image that is in violation of the defined setting. The modification may include, for example, adjusting a metadata field, removing a metadata field that corresponds to a defined setting of the master imaging application that is marked as disabled, a updating metadata field to match the text of a defined setting for the master imaging application, generating a thumbnail and inserting the thumbnail into the metadata, and removing a stamp from the image.

In the method 400, modifying the digital image file and associated metadata may be generally performed according to the techniques and operations described in the present application in relation to modifying the digital image in the example method 300 described in FIG. 3.

It will be appreciated that the various methods described above are presented in flowchart form to show a sequence of operations for ease of illustration and discussion, but that in some implementations a different sequence of operations may be used, additional operations may be included, and/or some operations shown sequentially may occur simultaneously or in parallel, without changing the substance of the processes.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A computer-implemented method comprising:
   determining that a digital image file includes at least some content in violation of a defined setting for a first imaging application; and
   in response to determining that the digital image file includes at least some content in violation of the defined setting for the first imaging application, providing a notification that prompts for adjusting a setting of a second imaging application,
   wherein the notification is based on determining that the digital image file includes at least some content in violation of the defined setting for the first imaging application.

2. The method of claim 1, wherein the notification, provided in response to determining that the digital image file includes at least some content in violation of the defined setting for the first imaging application, prompts for adjusting the setting of the second imaging application to comply with a policy.

3. The method of claim 1, wherein the notification, provided in response to determining that the digital image file includes at least some content in violation of the defined setting for the first imaging application, prompts for adjusting the setting of the second imaging application to comply with the defined setting for the first imaging application.

4. The method of claim 1, further comprising monitoring a file system for an occurrence of a file system event in relation to the digital image file, and wherein determining that the digital image file includes at least some content in violation of the defined setting for the first imaging application is performed upon detecting the occurrence of the file system event in relation to the digital image file.

5. The method of claim 1, further comprising, in response to determining that the digital image file includes at least some content in violation of the defined setting for the first imaging application, processing the digital image file to modify the at least some content.

6. The method of claim 1, wherein the notification provides an option to modify the digital image file to comply with a policy.

7. The method of claim 1, further comprising:
   obtaining a policy to be used by the first imaging application;
   providing, by the notification, an option to modify the digital image file to comply with the policy;
   receiving input indicating a selection of the option to modify the digital image file to comply with the policy; and
   in response to receiving input indicating the selection of the option to modify the digital image file, modifying the digital image file.

8. The method of claim 1, further including conveying the notification, that prompts for adjusting the setting of the second imaging application, to a third-party system.

9. The method of claim 1, wherein providing the notification that prompts for adjusting the setting includes triggering, by the notification, an alert.

10. A computing device comprising:
    a memory; and
    a processor coupled with the memory, the processor configured to:
       determine that a digital image file includes at least some content in violation of a defined setting for a first imaging application; and
       in response to determining that the digital image file includes at least some content in violation of the defined setting for the first imaging application, provide a notification that prompts for adjusting a setting of a second imaging application,
       wherein the notification is based on determining that the digital image file includes at least some content in violation of the defined setting for the first imaging application.

11. The device of claim 10, wherein the notification, provided in response to determining that the digital image file includes at least some content in violation of the defined setting for the first imaging application, prompts for adjusting the setting of the second imaging application to comply with a policy.

12. The device of claim 10, wherein the notification, provided in response to determining that the digital image file includes at least some content in violation of the defined setting for the first imaging application, prompts for adjusting the setting of the second imaging application to comply with the defined setting for the first imaging application.

13. The device of claim 10, the processor further configured to monitor a file system for an occurrence of a file system event in relation to the digital image file, and wherein determining that the digital image file includes at least some content in violation of the defined setting for the first imaging application is performed upon detecting the occurrence of the file system event in relation to the digital image file.

14. The device of claim 10, the processor further configured to, in response to determining that the digital image file includes at least some content in violation of the defined setting for the first imaging application, process the digital image file to modify the at least some content.

15. The device of claim 10, wherein the notification provides an option to modify the digital image file to comply with a policy.

16. The device of claim 10, the processor further configured to:
    obtaining a policy to be used by the first imaging application;
    providing, by the notification, an option to modify the digital image file to comply with the policy;

receiving input indicating a selection of the option to modify the digital image file to comply with the policy; and in response to receiving input indicating the selection of the option to modify the digital image file, modifying the digital image file.

17. The device of claim 10, the processor further configured to convey the notification, that prompts for adjusting the setting of the second imaging application, to a third-party system.

18. A non-transitory computer-readable storage medium storing processor-executable instructions, wherein the processor-executable instructions, when executed by a processor, are to cause the processor to:

determine that a digital image file includes at least some content in violation of a defined setting for a first imaging application; and in response to determining that the digital image file includes at least some content in violation of the defined setting for the first imaging application, provide a notification that prompts for adjusting a setting of a second imaging application, wherein the notification is based on determining that the digital image file includes at least some content in violation of the defined setting for the first imaging application.

* * * * *